United States Patent
Lin

(10) Patent No.: US 7,675,564 B2
(45) Date of Patent: Mar. 9, 2010

(54) DIGITAL CAMERA WITH LENS BEING AUTOMATICALLY RETRACTABLE AND AUTOMATIC RETRACTION METHOD THEREOF

(75) Inventor: Tzu-Chih Lin, Hsinchu County (TW)

(73) Assignee: Altek Corporation, Hsinchu (TW)

( * ) Notice: Subject to any disclaimer, the term of this patent is extended or adjusted under 35 U.S.C. 154(b) by 504 days.

(21) Appl. No.: 11/657,517

(22) Filed: Jan. 25, 2007

(65) Prior Publication Data

US 2008/0079835 A1 Apr. 3, 2008

(30) Foreign Application Priority Data

Sep. 29, 2006 (TW) .............................. 95136374 A

(51) Int. Cl.
*G02B 13/16* (2006.01)
*H04N 5/228* (2006.01)
(52) U.S. Cl. .................................. 348/335; 348/208.99
(58) Field of Classification Search ... 348/208.1–208.5, 348/208.11, 208.99, 352
See application file for complete search history.

(56) References Cited

U.S. PATENT DOCUMENTS

| 5,103,254 | A  | * | 4/1992 | Bell et al. ..................... 396/147 |
| 6,704,501 | B1 | * | 3/2004 | Washisu ....................... 396/55 |
| 7,505,067 | B2 | * | 3/2009 | Ogawa et al. .......... 348/208.99 |
| 2003/0142228 | A1 | * | 7/2003 | Flach et al. ................. 348/335 |
| 2003/0174229 | A1 | * | 9/2003 | Kubota ....................... 348/335 |

* cited by examiner

*Primary Examiner*—Luong T Nguyen
(74) *Attorney, Agent, or Firm*—Birch, Stewart, Kolasch & Birch, LLP

(57) ABSTRACT

A digital camera with a lens being automatically retractable and an automatic retraction method thereof are provided. After the digital camera is turned on, it can continuously capture images from the outside at a predetermined time interval, and convert the images into corresponding image characteristic values and then compare them. When the characteristic values of the current image differ from the previous one and reach a predetermined difference, the lens exposed outside is automatically retracted, so as to reduce damage to the lens due to falling or heavy shaking of the digital camera.

17 Claims, 2 Drawing Sheets

DIGITAL CAMERA WITH LENS BEING AUTOMATICALLY RETRACTABLE AND AUTOMATIC RETRACTION METHOD THEREOF

CROSS-REFERENCE TO RELATED APPLICATIONS

This non-provisional application claims priority under 35 U.S.C. §119(a) on Patent Application No(s). 095136374 filed in Taiwan, R.O.C. on Sep. 29, 2006, the entire contents of which are hereby incorporated by reference.

BACKGROUND OF THE INVENTION

1. Field of Invention

The present invention relates to a digital camera and a method for automatically retracting its lens, and more particularly to a digital camera that can determine whether a lens needs to be automatically retracted by comparing previous and current image characteristic values, and a method for automatically retracting the lens.

2. Related Art

As the fashion develops, recently almost all the unprofessional digital cameras tend to be light, thin, short and small, and the design becomes more and more beautiful. These digital cameras have a same characteristic that they can make people capture the digital images with approximately high quality in the simplest operation.

In order to simplify the operation, almost all these unprofessional digital cameras are provided with an automatically extendable/retractable lens, so that the lens can be automatically extended for users to take pictures immediately at the same time when a user press a switch to start the digital camera. When the use of the digital camera is finished, the user only needs to press again the switch, the lens can be automatically retracted and meanwhile the power can be turned off. However, when the digital camera is in a start-up state, the lens would normally keep a state of extending out of the body of the digital camera. Although some digital cameras provide a so-called automatic stand-by function, so that the lens can be automatically retracted and the digital camera can be turned off when a user does not have any operation after the camera is turned on for a while, the lens exposed outside of the digital camera is still under a high risk of being easily damaged after the digital camera is turned on but yet reaches the automatic stand-by time.

This high risk is due to improper holding of the camera by the user, and thus situations of falling or shaking of the camera occur. All these situations can cause damage to the lens of the digital camera and make it unusable or affect the quality of a photographic image because the lens might hit or rub against the ground or other rigid articles. In fact, a lens of a digital camera is comparable to the eyes, the window of soul, of a man, and if any damage occurs to the lens, the digital camera would be almost unusable. Accordingly, a lens is usually the most expensive part in a digital camera.

Therefore, how to protect a lens at any time after a digital camera is turned on and reduce damage to the lens due to unintended falling or improper shaking of the digital camera, is an important subject urgently needed to be overcome in the present smart mechanism development of digital cameras.

SUMMARY OF THE INVENTION

In view of the above-mentioned problems, the present invention is mainly directed to providing a digital camera with a lens being automatically retractable and an automatic retraction method thereof. A main object thereof is keeping monitoring changes of the external environment at any time after the lens is extended from the digital camera, so that the lens of the digital camera can be automatically retracted when the lens is determined to be at a high risk of being damaged.

In order to achieve the aforementioned object, the digital camera with a lens being automatically retractable disclosed by the present invention at least comprise: a lens unit for controlling the extension/retraction of the lens; a sense unit for capturing an image in the lens unit; a switch unit for being coupled to the lens unit, which can send a signal to command the lens unit to extend the lens when switched on; a timing unit for timing, and sending a detecting signal when reaching a predetermined interval; and a control unit, coupled to all the above units, for sending a signal to require the sense unit to capture a first image and converting the first image into a first image characteristic value to be registered when the switch unit is switched on, sending a signal to require the timing unit to start timing after registering, requiring the sense unit to capture a second image and converting it into a second image characteristic value upon receiving the detecting signal, and sending a signal to the switch unit so as to require the switch unit to send a signal to command the lens unit to retract the lens and switch off the switch unit, when it is determined that the second image characteristic value and the first image characteristic value reach a predetermined difference.

Through the description of the operation blocks and operation flow of the above-mentioned digital camera, the present invention can really solve the problem that the lens cannot be perfectly protected when extended after the digital camera is turned on, and can achieve an effect of reducing damage to the lens due to falling or shaking of the digital camera.

The characteristics and practice of the present invention will be described in detail in the preferred embodiments with reference to the figures.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
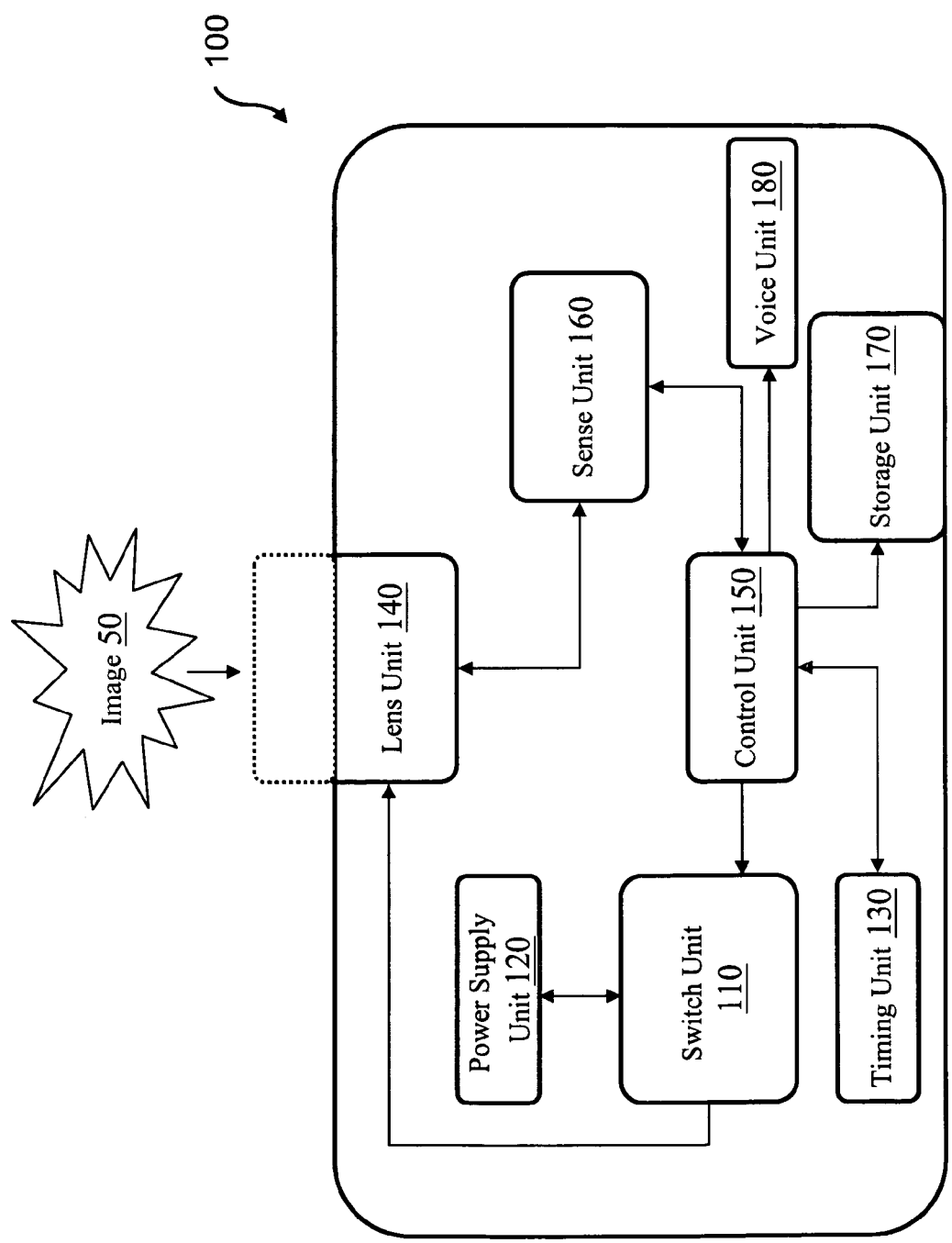
FIG. 1 is a schematic view of operation blocks of a digital camera with a lens being automatically retractable according to the present invention.

The present invention provides a digital camera with a lens being automatically retractable, as shown in FIG. 1, and a body of a digital camera 100 at least includes the following component units.

A switch unit 110 coupled with a lens unit 140 is used to send a signal to command the lens unit 140 to extend the lens when switched on, and send a signal to command the lens unit 140 to retract the lens before being switched off. Accordingly, the switch unit 110 serves to control the lens unit 140 through a signal according to the on/off state thereof. The switch unit 110 can be at a switch-on state when pressing a mechanical switch for a first time, and at a switch-off state when pressing the mechanical switch for another time. The on/off state of the switch unit 110 can be controlled by being triggered through an electronic signal in the digital camera 100. In the present invention, the switch unit 110 is switched on through a pressing trigger of a mechanical switch, while the switch-off is controlled through a trigger of an electronic signal sent by a control unit 150 within the digital camera 100.

A timing unit 130 is used to receive a signal from the control unit 150 so as to start timing, and is used to send a detecting signal to the control unit 150 when reaching a predetermined interval. The timing unit 130 as described here is a timer, which can set a time interval, such as ½ second, and 1 second, and can send the detecting signal when reaching this set time interval.

A lens unit 140 coupled with the switch unit 110 and a sense unit 160 is used to receive a signal trigger from the switch unit 110 so as to control the extension/retraction of the lens. In addition to the lens (not shown), the lens unit 140 at least includes a cover (not shown) for preventing the dust from entering the lens and protecting the lens, and a telescoping/open-close mechanism (not shown) for controlling the extension/retraction of the lens and the opening and closing of the cover. Therefore, when the lens unit 140 wants to extend the lens upon receiving the signal trigger, the telescoping/open-close mechanism may open the cover and push out the lens to make it at an extension state, and when the lens unit 140 wants to retract the lens upon receiving the signal trigger, on the contrary, the telescoping/open-close mechanism first pulls back the lens to make it at a retraction state and then close the cover, so as to achieve an anti-dust and protection effect.

The control unit 150 coupled to the switch unit 110, the timing unit 130 and the sense unit 160, is used to realize the controlling of the automatic retraction of the lens when the digital camera 100 is at a turn-on state. In a normal implementation, the control unit 150 is a microprocessor, which mainly performs the following controlling actions.

(1) When the switch unit 110 is switched on (i.e., after the digital camera 100 is turned on for power on), the control unit 150 sends a signal to require the sense unit 160 to capture an image 50 (called a first image) through the lens unit 140, and converts the first image 50 into a first image characteristic value for being registered. The first image characteristic value is mainly registered in a register (not shown) in the control unit 150, such that when a next image 50 (called a second image) is captured and a second image characteristic value is obtained, it can be read as a comparison basis to be compared with the second image characteristic value.

(2) When receiving the detecting signal from the timing unit 130, the control unit 150 requires the sense unit 160 to capture the second image and converts it into the second image characteristic value, and then compares the first image characteristic value with the second image characteristic value. When the difference between the first image characteristic value and the second image characteristic value reaches a predetermined difference, a signal is sent to the switch unit 110 to command the lens unit 140 to retract the lens and switch off the switch unit 110.

(3) When the control unit 150 finds that the comparison result between the first image characteristic value and the second image characteristic value does not reach the predetermined difference after comparing them, the control unit 150 registers the second image characteristic value into the register for replacing the originally registered first image characteristic value as a new first image characteristic value that will be used as the next comparison basis.

(4) When the control unit 150 finds that the comparison result between the first image characteristic value and the second image characteristic value does not reach the predetermined difference after comparing them, in addition to performing the controlling action of (3), the control unit 150 also sends a signal to require the timing unit 130 to restart timing at the same time.

The sense unit 160 coupled with the lens unit 140 is mainly used to capture images through the lens unit 140. In a general implementation, the sense unit 160 can be a CCD sensor or a CMOS sensor.

The above-mentioned control unit 150 is further coupled to a storage unit 170 so that an image captured by the sense unit 160 can be directly stored. The first image and the second image in the present invention can optionally be set whether being stored or not, by a user through other software in the digital camera 100, such that a situation before the lens of the digital camera 100 is retracted can be known. Usually, in application, the storage unit 170 can be implemented as an SRAM or flash memory in a built-in or plug-in manner.

The above-mentioned switch unit 110 is further coupled to a power supply unit 120, and upon being switched on, the switch unit 110 may send a signal to the power supply unit 120 to require the power supply unit 120 to supply power to individual units in the digital camera 100 for operation. Since the detail about the power supplying of the power supply unit 120 belongs to the conventional art, it is not shown in the figures and will not be further described.

In order to make it known to a user that the digital camera 100 retracts the lens because of falling and heavy shaking, in the present invention, a voice unit 180 can be further coupled to the control unit 150, so that the control unit 150 can send a signal to the voice unit 180 to require the voice unit 180 to play a preset voice message at the same time when the control unit 150 sends a signal to the switch unit 110 to require the switch unit 110 to command the lens unit 140 to retract the lens, so as to achieve an effect of informing the user. The voice unit 180 is usually implemented as a loudspeaker.

Figure 2:
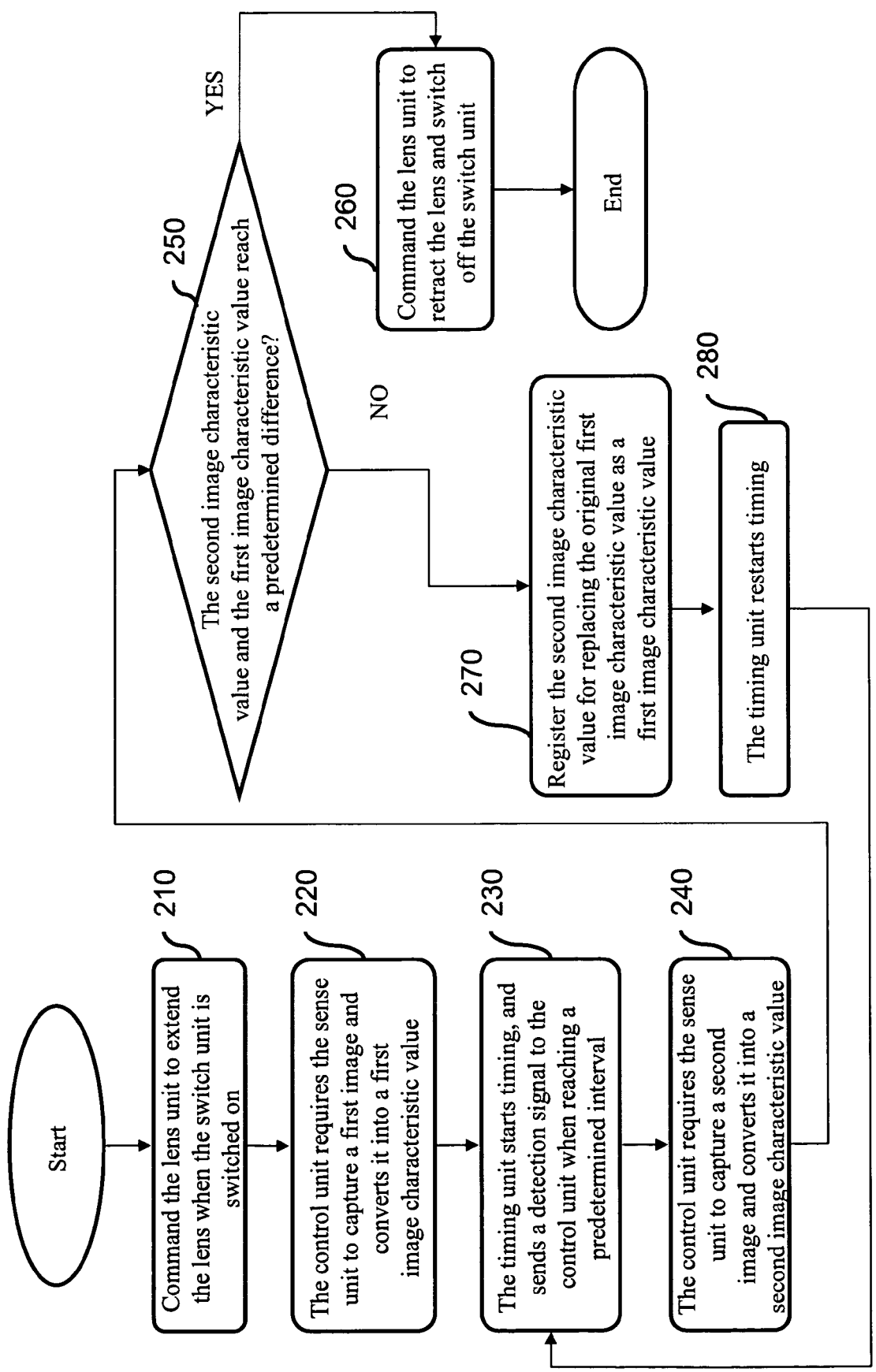
FIG. 2 is an operation flowchart of a method for automatically retracting a lens of a digital camera according to the present invention.

A detailed operation method of the present invention, i.e., a method for automatically retracting the lens of the digital camera 100, is described in detail through FIG. 2. First, a user presses the switch unit 110 such that the switch unit 110 is at a switch-on state, and thus the switch unit 110 will send a signal to require the power supply unit 120 to start to supply power to individual units in the digital camera 100, so that the units are in operation and the digital camera 100 is changed from a turn-off state to a turn-on state, where, at the same time when the switch unit 110 is switched on, the lens unit 140 is also made to extend the lens through a signal control (Step 210). After the lens is extended, the control unit 150 actively sends a signal to require the sense unit 160 to capture a first image through the lens unit 140, and after receiving the first image, the control unit 150 converts the first image into a first image characteristic value for being registered in the register in the control unit 150 (Step 220), so as to be used as a subsequent comparison basis. After the control unit 150 finishes the register of the first image characteristic value, the timing unit 130 receives a signal control from the control unit 150 to start timing, and when reaching a predetermined interval (such as ½ second, the predetermined interval can be set through other software in the digital camera 100), the timing unit 130 may send a detecting signal to the control unit 150 (Step 230). When receiving the detecting signal, the control unit 150 sends a signal to require the sense unit 160 to capture a second image, and the control unit 150 receives the second image and converts it into a second image characteristic value (Step 240). Next, the control unit 150 instantly compares the first image characteristic value with the second image characteristic value and determines whether the difference between them reaches a predetermined difference (Step 250), where the value of the predetermined difference can also be set through other software provided in the digital camera 100 according to comparison items of different image characteristic values. When reaching the predetermined difference, a signal is sent to the switch unit 110 to require the switch unit 110 to send a signal to the lens unit 140 so as to retract the lens, and the switch unit 110 is automatically switched off after the lens is retracted (Step 260), such that the digital camera 100 is changed from a turn-on state to a turn-off state.

Before turning off the camera, the control unit 150 can send a signal to the voice unit 180 at the same time when it sends a signal to the switch unit 110, such that the voice unit sends a preset voice (not shown), such as a "beep", so as to inform the user that the digital camera 100 has retracted the lens and is at a turn-off state.

The above-mentioned images captured by the sense unit 160 such as the first image or the second image can be set whether needs to be additionally stored or not, by the user as required. If it is set that it needs to be additionally stored, the control unit 150 can unload the image into the storage unit 170 such as an SRAM and a flash memory after obtaining it. Usually, the digital camera 100 can store an image for the user by building in or plugging in a memory card.

In practice, the detail about comparing the second image characteristic value with the first image characteristic value in Step 250 mainly refers to determine whether the digital camera 100 is likely to be subjected to falling or heavy shaking, by using a change in a previous image and a current image generated at the predetermined interval, so as to retract the lens and thus achieve an effect of reducing damage. The characteristic of the difference comparison can be substantially classified into (1) an image distribution difference and (2) an image definition difference, which are two aspects used to determine the difference between the previous and current images, as will be illustrated below.

(1) The image distribution difference. It is determined whether the change in the previous and current images occurs mainly by using the distribution position and situation of the previous and current image characteristic values, where these image characteristic values can be an image color distribution, an image brightness distribution, an image object distribution and so on, and comparison items corresponding to different image characteristic values can be applied in the present invention to capture and convert the image characteristic values, through technologies presently known or possibly developed in the future that are well-known or understood by those skilled in the art. Taking the image object distribution as an example, it is assumed that a main image object in an image (such as a person) is changed from being previously distributed in the center of the first image characteristic value to being distributed above the second image characteristic value (even not appearing in the second image characteristic value) at the predetermined time interval, so that the image object distribution difference between the second image characteristic value and the first image characteristic value reaches a predetermined difference, in which case it is determined that the digital camera 100 is possibly subjected to falling or heavy shaking, and thus the lens needs to be automatically retracted.

(2) The image definition difference. It is determined whether the change in the previous and current images occurs mainly by using the definitions of the previous and current image characteristic values, where the definition can be determined based on a definition of a whole image or an individual image object in an image. As such, the capturing and conversion of the image resolution can also be applied in the present invention to process the image characteristic values, through technologies presently known or possibly developed in the future that are well-known or understood by those skilled in the art. Taking a definition of an individual object in an image as an example, it is assumed that a main image object in an image (such as a person) is changed from a previous definition of 98% in the first image characteristic value to a definition of only 4% in the second image characteristic value, such that the definition difference between the second image characteristic value and the first image characteristic value reaches a predetermined difference, in which case it is determined that the digital camera 100 is possibly subjected to falling or heavy shaking, and thus the lens needs to be automatically retracted.

Although the difference determination of the image characteristic values is as described above, the present invention is not limited to this. In practice, in order to achieve a more precise determination, more than one comparison item can be combined to make a determination, which can be improved by those skilled in the image comparison technology based on the technical concepts of the present invention.

Next, the main operation flow of the method of the present invention is illustrated. If it is determined in Step 250 that the second image characteristic value and the first image characteristic value do not reach the predetermined difference, it denotes that the digital camera 100 is now not at an immediate possible risk of damaging the lens, however, because the external environment for the digital camera 100 has changed now, an update procedure must be performed on the first image characteristic value. As illustrated in Step 270 in FIG. 2, the control unit 150 registers the second image characteristic value into the register for replacing the first image characteristic value as a first image characteristic value, so as to be used as a subsequent comparison basis. Indeed, because the previous comparison has been completed and a new comparison procedure will be restarted, the control unit 150 meanwhile sends a signal to require the timing unit 130 to restart timing, and the whole flow is controlled to go back to Step 230, where the other steps are as described above and will not be further described.

Through the description of the operation blocks and operation flow of the above-mentioned digital camera, the present invention can really solve the problem that the lens cannot be perfectly protected when extended after the digital camera is turned on, and can achieve an effect of reducing damage to the lens due to falling or shaking of the digital camera.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatically retracting a digital camera lens, at least comprising:
   (a) commanding a lens unit to extend the digital camera lens when a switch unit is switched on;
   (b) driving a sense unit to capture a first image by a control unit, and converting the first image into a first image characteristic value for being registered;
   (c) starting a timing unit to count time, and sending a detecting signal to the control unit when reaching a predetermined interval;

(d) capturing a second image by the sense unit, and converting the second image into a second image characteristic value; and (e) commanding the lens unit to retract the digital camera lens and switching off the switch unit, when comparing the second image characteristic value with the first image characteristic value and determining that the second image characteristic value and the first image characteristic value reach a predetermined difference.

2. The method for automatically retracting the digital camera lens as claimed in claim 1, wherein when comparing the second image characteristic value with the first image characteristic value and determining that the second image characteristic value and the first image characteristic value do not reach the predetermined difference, the method further comprises the steps of:

(f1) registering the second image characteristic value for replacing the first image characteristic value as a new first image characteristic value; and (f2) restarting the timing unit, and going back to Step (c).

3. The method for automatically retracting the digital camera lens as claimed in claim 1, wherein the first image characteristic value and the second image characteristic value are selected from the group consisting of a color distribution characteristic of image, a brightness distribution characteristic of image, and an object distribution characteristic of image.

4. The method for automatically retracting the digital camera lens as claimed in claim 1, wherein the first image characteristic value and the second image characteristic value are selected from the group consisting of a definition characteristic of image and an object definition characteristic of image.

5. The method for automatically retracting the digital camera lens as claimed in claim 1, wherein the predetermined difference refers to a distribution difference of image color, image brightness or image object in the second image characteristic value compared with that in the first image characteristic value.

6. The method for automatically retracting the digital camera lens as claimed in claim 1, wherein the predetermined difference refers to a definition difference of image or image object in the second image characteristic value compared with that in the first image characteristic value.

7. A digital camera with a lens being automatically retractable, at least comprising:

a lens unit, for controlling the extension/retraction of the lens;

a sense unit, coupled to the lens unit, for retrieving an image captured by the lens unit;

a switch unit, coupled to the lens unit, for commanding the lens unit to extend the lens when switched on;

a timing unit, for timing, and sending a detecting signal when reaching a predetermined interval; and a control unit, coupled to the above said units, for driving the sense unit to capture a first image and converting the first image into a first image characteristic value to be registered when the switch unit is switched on, starting the timing unit to count time after registering, and requiring the sense unit to capture a second image and converting the second image into a second image characteristic value upon receiving the detecting signal, and driving the switch unit to command the lens unit to retract the lens and to switch off the switch unit, when comparing the second image characteristic value with the first image characteristic value and determining that the second image characteristic value and the first image characteristic value reach a predetermined difference.

8. The digital camera with the lens being automatically retractable as claimed in claim 7, wherein the digital camera further comprises a storage unit coupled to the control unit, which can be a SRAM or a flash memory and is used to store the first image and the second image captured from the sense unit.

9. The digital camera with the lens being automatically retractable as claimed in claim 7, wherein the digital camera further comprises a power supply unit coupled to the switch unit, which can supply power to said units for operation, when the switch unit is switched on.

10. The digital camera with the lens being automatically retractable as claimed in claim 7, wherein the digital camera further comprises a voice unit coupled to the control unit, which is a loudspeaker and is controlled by the control unit to send a voice message.

11. The digital camera with the lens being automatically retractable as claimed in claim 7, wherein the control unit further comprises a register for registering the first image characteristic value used for comparison.

12. The digital camera with the lens being automatically retractable as claimed in claim 7, wherein when comparing the second image characteristic value with the first image characteristic value and determining that the second image characteristic value and the first image characteristic value do not reach the predetermined difference, the second image characteristic value is registered by the control unit to replace the original first image characteristic value as a new first image characteristic value.

13. The digital camera with the lens being automatically retractable as claimed in claim 12, further comprising commanding the timing unit to restart by the control unit.

14. The digital camera with the lens being automatically retractable as claimed in claim 7, wherein the first image characteristic value and the second image characteristic value are selected from the group consisting of a color distribution characteristic of image, a brightness distribution characteristic of image, and an object distribution characteristic of image.

15. The digital camera with the lens being automatically retractable as claimed in claim 7, wherein the first image characteristic value and the second image characteristic value are selected from the group consisting of a definition characteristic of image and an object definition characteristic of image.

16. The digital camera with the lens being automatically retractable as claimed in claim 7, wherein the predetermined difference refers to a distribution difference of image color, image brightness or image object in the second image characteristic value compared with that in the first image characteristic value.

17. The digital camera with the lens being automatically retractable as claimed in claim 7, wherein the predetermined difference refers to a definition difference of image or image object in the second image characteristic value compared with that in the first image characteristic value.

* * * * *